(12) United States Patent
Jossens et al.

(10) Patent No.: US 6,475,376 B2
(45) Date of Patent: *Nov. 5, 2002

(54) MILD HYDROTREATING/EXTRACTION PROCESS FOR LOW SULFUR FUEL FOR USE IN FUEL CELLS

(75) Inventors: Lawrence W. Jossens, Albany, CA (US); Curtis L. Munson, Oakland, CA (US); Gunther H. Dieckmann, Walnut Creek, CA (US)

(73) Assignee: Chevron U.S.A. Inc., San Ramon, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/826,529

(22) Filed: Apr. 3, 2001

(65) Prior Publication Data

US 2001/0020596 A1 Sep. 13, 2001

Related U.S. Application Data

(63) Continuation-in-part of application No. 09/330,762, filed on Jun. 11, 1999, now Pat. No. 6,228,254.

(51) Int. Cl.[7] .............................................. C10G 45/04
(52) U.S. Cl. ........................ 208/213; 208/217; 208/212; 208/209; 208/216 R
(58) Field of Search ................................ 208/212, 209, 208/213, 217, 216 R

(56) References Cited

U.S. PATENT DOCUMENTS

| | | | |
|---|---|---|---|
| 3,331,770 A | 7/1967 | Cockerham | 208/212 |
| 4,287,050 A | 9/1981 | Eastman et al. | 208/215 |
| 4,290,913 A | 9/1981 | Frame | 252/428 |
| 4,314,901 A | 2/1982 | Nowack et al. | 208/228 |
| 4,486,297 A | 12/1984 | Matsumoto et al. | 208/211 |
| 5,059,304 A | 10/1991 | Field | 208/99 |
| 5,259,946 A | 11/1993 | Robinson et al. | 208/65 |
| 5,271,835 A | 12/1993 | Gorawara et al. | 208/228 |
| 5,290,427 A | 3/1994 | Fletcher et al. | 208/89 |
| 5,298,150 A | 3/1994 | Fletcher et al. | 208/89 |
| 5,360,536 A | 11/1994 | Nemeth et al. | 208/248 |
| 5,401,365 A | 3/1995 | Chen et al. | 203/32 |
| 5,407,559 A | 4/1995 | Degnan et al. | 208/89 |
| 5,411,658 A | 5/1995 | Chawla et al. | 208/89 |
| 5,454,933 A | 10/1995 | Savage et al. | 208/212 |
| 5,510,016 A | 4/1996 | Hilbert et al. | 208/89 |
| 5,518,607 A | 5/1996 | Field et al. | 208/12 |
| 5,582,714 A | 12/1996 | Forte | 208/237 |
| 5,597,476 A | 1/1997 | Hearn et al. | 208/208 R |
| 5,769,909 A | 6/1998 | Bonk et al. | 48/127.9 |
| 5,807,475 A | 9/1998 | Kulprathipanja et al. | 208/208 R |
| 5,843,300 A | 12/1998 | Zinnen et al. | 208/250 |
| 5,846,406 A | 12/1998 | Sudhakar et al. | 208/216 R |
| 5,925,239 A | 7/1999 | Klein et al. | 208/213 |
| 5,928,497 A | 7/1999 | Iaccino | 208/212 |
| 5,931,977 A * | 8/1999 | Yang | 44/320 |
| 6,156,084 A * | 12/2000 | Bonville, Jr. et al. | 48/61 |
| 6,228,254 B1 * | 5/2001 | Jossens et al. | 208/212 |

OTHER PUBLICATIONS

Del Rossi et al., "Hydrofinishing Olefinic Gasoline", Prepared for Presentation at: AIChE Spring National Meeting, Hydroprocessing I Symposium, Fuels and Petrochemicals Division, Mar. 21, 1995, Houston, Texas.

Hatanaka et al., "Selective CCG HDS on Co–Mo/y–$Al_2O_3$ Catalyst Modified by Coking Treatment" no month.

Desai et al., "FCC Gasoline Sulfur Reduction", Fuel Reformulation, V.4(6), pp. 43–44 (Nov./Dec. 1994).

* cited by examiner

Primary Examiner—Nadine Norton
(74) Attorney, Agent, or Firm—James W. Ambrosius

(57) ABSTRACT

A two step sulfur removal for treatment of hydrocarbonaceous fuel intended for use in a fuel cell comprising a mild hydrotreating step followed by an extraction step reduces the sulfur content in fuel to 5 ppm total sulfur or less and a fuel processor suitable for carrying out the process.

17 Claims, No Drawings

US 6,475,376 B2

MILD HYDROTREATING/EXTRACTION PROCESS FOR LOW SULFUR FUEL FOR USE IN FUEL CELLS

CROSS REFERENCE TO RELATED APPLICATION

This application is a continuation in part of co-pending U.S. patent application Ser. No. 09/330,762 filed Jun. 11, 1999, now U.S. Pat. No. 6,228,254 the entire contents of which are hereby incorporated by reference.

FIELD OF THE INVENTION

The present invention is directed to a process for reducing the sulfur content in a fuel, such as gasoline, to a very low level in order to make it suitable for use in a fuel cell.

BACKGROUND OF THE INVENTION

Fuel cells offer certain advantages over conventional internal combustion engines in certain applications. Fuel cells are usually more efficient and emit less pollutants into the environment when compared to heat engines. Accordingly, fuel cell systems are being proposed for both stationary and mobile applications which have traditionally been occupied by internal combustion engines. Fuel cells with which the present invention is concerned are referred to as proton exchange membrane (PEM) fuel cells. PEM fuel cells require hydrogen as a fuel and a source of oxygen for their operation. During operation the hydrogen is contacted with a catalyst, usually a platinum based catalyst, where it is ionized and gives up an electron. The resulting electrical charge provides a source of electricity which may be used to power an electric motor.

Demonstration PEM fuel cell systems typically have used pure hydrogen as a fuel. However, hydrogen has a number of significant disadvantages as a practical fuel for commercial applications. Therefore, other fuels such as natural gas and methanol which are easily converted to hydrogen at the site of the fuel cell have been proposed, but these fuels also have serious drawbacks. For example, methanol is expensive as a fuel, lacks an extensive distribution network, and presents groundwater pollution problems. Natural gas while useful for stationary applications is less practical for wide spread use as a transportation fuel due to its storage and handling problems. Gasoline has been suggested as a suitable alternative fuel for use in fuel cells and has the advantages over other fuels of being relatively inexpensive, of already being widely available through a commercial distribution network, and of lacking the storage problems associated with gases such as hydrogen and natural gas. However, a principal disadvantage of gasoline as a fuel for use in fuel cells is its sulfur content. The catalysts used to convert the hydrogen and oxygen in the fuel cell to electricity are very sensitive to even very low levels of sulfur and are rapidly deactivated at the sulfur levels normally present in conventional gasoline which typically falls within the range of from about 10 to 50 ppm. Gasoline intended for fuel cells would require a significantly lower sulfur content than 10 ppm, usually 5ppm or less, preferably less than 1 ppm and even more preferably below 0.5 ppm.

Gasoline is generally prepared from a number of blend streams. Typical examples include butanes, light straight run, isomerate, FCC cracked products, hydrocracked naphtha, coker gasoline, alkylate, reformate, added ethers, etc. Of these, gasoline blend stocks from the FCC, the reformer and the alkylation unit account for a major portion of the gasoline pool. FCC gasoline, and if present, coker naphtha and pyrolysis gasoline, generally contribute a substantial portion of the pool sulfur.

Sulfur present in the gasoline pool may be in one of several molecular forms, including thiophenes, mercaptans and disulfides. Typical thiophenes include thiophene ($<(CH:CH)_2>S$) and its alkylated derivatives, and benzothiophene (alternatively thianaphthene). Typical mercaptans occurring in the sulfur-containing gasoline streams include thiophenol ($C_6H_5SH$), and the alkylthiols from ethanethiol to nonanethiol, with potentially smaller amounts of the higher alkylthiols.

A number of methods have been proposed for removing sulfur from gasoline. In general, hydrotreating is the method of choice, on account of the cost and ease of processing using the catalytic method. However, sulfur removal by hydrotreating has several disadvantages for preparing fuels suitable for use in a fuel cell. Hydrotreating requires relatively severe operating conditions which make it impractical in most instances to include the hydrotreating unit as part of a fuel processor in association with the fuel cell itself. In addition, hydrotreating converts olefins present in the gasoline which leads to octane loss. A special advantage of the process of the present invention is that the process is capable of reducing the sulfur content of the gasoline to a level suitable for use in fuel cells while minimizing octane loss. Therefore, fuels prepared according to the present invention may serve either conventional internal combustion engines or fuel cells.

According to U.S. Pat. No. 3,957,625, the sulfur impurities tend to concentrate in the heavy fraction of the gasoline and a method for removing the sulfur includes hydrodesulfurization of the heavy fraction of the catalytically cracked gasoline so as to retain the octane contribution from the olefins which are found mainly in the lighter fraction. U.S. Pat. No. 5,290,427 teaches fractionating a sulfur containing gasoline feed, and introducing each fraction in turn into a hydrodesulfurization reactor at spaced locations along the length of the reactor according to boiling point. By this method, low boiling, olefin containing fractions are treated for a relatively shorter time, and higher boiling fractions, with lesser amounts of olefins and higher amounts of sulfur containing molecules, are treated for a relatively longer time. U.S. Pat. No. 5,290,427 further teaches contacting the intermediate product from the hydrodesulfurization reaction zone with an acidic catalyst, reportedly to produce a product having a higher octane number than that of the intermediate product.

In U.S. Pat. No. 4,049,542, Gibson et al. discloses a process in which a copper catalyst is used to desulfurize an olefinic hydrocarbon feed such as catalytically cracked light naphtha. This catalyst is stated to promote desulfurization while retaining the olefins and their contribution to product octane.

In U.S. Pat. 5,059,304 a desulfurization process is described in which a naphtha feed is subjected to a mild reforming step followed by treatment with sulfur sorbent to remove the hydrogen sulfide. The reforming step is conducted at a temperature above 575° F., and preferably above 660° F.

The process of the present invention is particularly advantageous because, due to the very mild process conditions employed, it may be used in direct association with the fuel cell, that is, the desulfurization process may be carried out as part of an integrated fuel cell system. This is of major importance since the presence of sulfur at the levels with which the present invention is concerned may readily result from contamination during handling, such as during tankage or passage through contaminated fuel lines. Therefore, fuels which as manufactured may meet the stringent sulfur standard required for use in fuel cells, may easily become contaminated during delivery to the site of the fuel cell. With the present invention it is possible to desulfurize the fuel at the site of the fuel cell, if stationary, or in the case of a vehicle by use of an on-board fuel processor. Thus the desulfurized fuel may be fed directly into the fuel cell with minimal opportunity for contamination.

SUMMARY OF THE INVENTION

The present invention is directed to a process for desulfurizing a hydrocarbonaceous fuel intended for use in a fuel cell which comprises (a) contacting a hydrocarbonaceous fuel containing sulfur with hydrogen in the presence of a hydrotreating catalyst at a temperature of between 300° F. and 500° F., a total pressure between 50 psig and 500 psig, and a feed rate between 0.5 $hr^{-1}$ and 10 $hr^{-1}$ for a time sufficient to convert up to 95% of the thiophenes present in the fuel, to produce a hydrotreated hydrocarbonaceous fuel; (b) contacting the hydrotreated hydrocarbonaceous fuel with a solid adsorbent or a liquid extractant selected to rereduce the sulfur compounds remaining in the hydrotreated hydrocarbonaceous to about 5.0 ppm or less; (c) recovering a hydrocarbonaceous fuel having a reduced sulfur content; and (d) supplying the hydrocarbonaceous fuel having reduced sulfur as fuel for a fuel cell. When referring to fuel cells in this disclosure, it should be understood that the reference is to PEM fuel cells.

The present process is a multi-step process for removing sulfur from a sulfur-containing hydrocarbonaceous fuel intended for use in a fuel cell. While other hydrocarbonaceous fuels suitable for use in fuel cells may be desulfurized by the present process, the process is particularly advantageous when the hydrocarbonaceous fuel is gasoline or gasoline mixed with other hydrocarbons, such as, for example, methanol. A hydrotreating step at very mild conditions converts a portion of the sulfur compounds present and produces a hydrotreated product from which at least a significant portion, preferably substantially all, of the remaining sulfur compounds may be more easily removed by adsorption or extraction. The process of this invention may be employed as part of a fuel processor associated with the fuel cell. Gasoline streams produced using the process of the present invention may be produced which contain less than about 5 ppm total sulfur, more preferably less than about 1 ppm total sulfur, and still more preferably less than about 0.5 ppm total sulfur. Ideally the amount of amount of sulfur should be as low as possible, therefore total sulfur levels of less than 0.1 ppm would be most preferred.

The present invention is also directed to a mobile fuel processor suitable for desulfurizing a hydrocarbonaceous fuel intended for use in a PEM fuel cell used to power a transportation platform , said fuel processor comprising (a) a hydrotreating zone suitable for contacting said hydrocarbonaceous fuel with hydrogen in the presence of a hydrotreating catalyst at a temperature of between 300° F. and 500° F., a total pressure of between 50 psig and 500 psig, a space velocity of between 0.5 $hr^{-1}$ and 10 $hr^{-1}$ for time sufficient to convert up to 95% of the thiophenes present in the fuel and (b) an adsoption zone containing a solid adsorbent or liquid extractant capable of reducing the total sulfur compounds present in the fuel leaving the hydrotreating zone to 5.0 ppm or less. Two possible configurations of the fuel processor are possible. In one embodiment the hydrotreating catalyst and adsorbant, most likely a solid adsorbant, are located in a single reactor chamber. In a second embodiment the hydrotreating zone and the adsorption zone are physically located in separate chambers within the fuel processor.

The term transportation platform refers to a mobile platform intended for civilian or military use for transporting passengers, livestock, goods, commodities, ores, munitions, and the like, including, for example, motor vehicles, such as cars and trucks, various construction vehicles, tanks, trains, airplanes, watercraft including ships, etc.

DETAILED DESCRIPTION

Sulfur compounds present in gasoline occur principally as mercaptans, aromatic heterocyclic compounds and disulfides. Relative amounts of each depend on a number of factors, many of which are refinery, process and feed specific. In general, heavier fractions contain a larger amount of sulfur compounds, and a larger fraction of these sulfur compounds are in the form of aromatic heterocyclic compounds. In addition, certain streams commonly blended for gasoline, e.g. FCC feedstocks, contain high amounts of the heterocyclic compounds. Gasoline streams containing significant amounts of these heterocyclic compounds are difficult to process. Very severe operating conditions have been conventionally specified for hydrotreating processes to desulfurize gasoline streams. Adsorption processes, used as an alternative to hydrogen processing, have very low removal efficiencies, since the aromatic heterocyclic sulfur compounds have adsorptive properties similar to the aromatic compounds in the hydrocarbon matrix.

Rather than operating a hydrotreating step at high severities in order to reduce the sulfur content of a sulfur-containing hydrocarbonaceous fuel such as gasoline, the hydrotreating step in the present process is operated at very mild conditions of temperature, pressure and feed rate. Among other factors, the present invention is based on the surprising discovery that, during the mild hydrotreating step, which converts up to 95% of the aromatic heterocyclic sulfur compounds, the amount of mercaptans present in the gasoline blend actually increases while the amount of the aromatic heterocyclic sulfur compounds is reduced. Rather than hydrotreating to remove the mercaptans remaining after a substantial portion of the heterocyclic sulfur compounds are converted, these remaining mercaptans in the process are then removed by contacting the hydrocarbonaceous fuel with a solid adsorbent or a liquid extractant having an affinity for the mercaptan sulfur compounds. This contacting step to sorb the remaining sulfur compounds can be achieved at very high hydrocarbonaceous fuel yields and in the case of gasoline with little or no reduction in octane. An additional advantage of the present process over conventional processes which use a single adsorption step to remove sulfur from fuel streams is that the two step process of this invention results in less total loss of the hydrocarbons making up the fuel. The reason is that the mercaptans formed in the mild hydrotreating step of the present process contain a significantly lower hydrocarbon to sulfur ratio than the thiophene forms that would otherwise be present. For example, the following table compares the molecular weight and hydrocarbon to sulfur ratios of several sulfur-containing hydrocarbons.

TABLE 1

| FORM OF SULFUR | MOLECULAR WEIGHT | RATIO HC/S |
| --- | --- | --- |
| Ethyl Mercaptan | 62.1 | 1.9 |
| Thiophene | 84.1 | 2.6 |
| Benzyl Thiophene | 134.2 | 4.2 |
| Thiotolene | 98.2 | 3.1 |

The table compares the higher ratios of hydrocarbons to sulfur of three common sulfur contaminants in gasoline to ethyl mercaptan which is one of the primary forms of sulfur remaining in the fuel after the mild hydrotreating step. Thus significantly less hydrocarbons would be expected to be lost in the soption step resulting a higher yield of fuel.

The present two-step sulfur removal process is equally suited to streams containing high amounts of mercaptans, such as a coker pentane/hexane stream. Such mercaptan-containing streams may be suitably treated by contacting the stream with a solid adsorbent or a liquid extractant in an extraction process. However, the use of a very mild hydrotreating step, according to the present process, followed by an adsorption or extraction step, provides good sulfur removal, while requiring a considerably smaller processing unit for conducting the adsorption or extraction step. Thus, the use of the mild hydrotreating step is particularly advantageous for use in preparing fuels for use in a fuel cell operating in a motor vehicle.

The present process is effective for reducing the sulfur content of a gasoline or mixture containing gasoline and other hydrocarbons. As used herein, the term "gasoline" is intended to include hydrocarbons from individual refinery streams suitable for use as a blend stock for gasoline, or a blended gasoline stream containing two or more streams, each of which are suitable for use as a gasoline blend stock. A suitable gasoline blend stock, when blended with other refinery streams, produces a combined stream which meets the requirements for gasoline, which requirements are well documented in Federal and State regulations.

The feed to the process comprises a sulfur-containing petroleum fraction which boils in the gasoline boiling range, including FCC gasoline, coker pentane/hexane, coker naphtha, FCC naphtha, straight run gasoline, and mixtures containing two or more of these streams. Such gasoline blending streams typically have a normal boiling point within the range of 0° C. and 260° C., as determined by an ASTM D86 distillation. Feeds of this type include light naphthas typically having a boiling range of about $C_6$ to 165° C. (330° F.); full range naphthas, typically having a boiling range of about $C_5$ to 215° C. (420° F.), heavier naphtha fractions boiling in the range of about 125° C. to 210° C. (260° F.–412° F.), or heavy gasoline fractions boiling at, or at least within, the range of about 165° C. to 260° C. (330° F.–500° F.), preferably about 165° C. to 210° C. (330° F.–412° F.). In general, a gasoline fuel will distill over the range of from about room temperature to 260° C. (500° F.).

In addition, suitable hydrocarbonaceous fuels may include mixtures containing other hydrocarbons in association with gasoline. For example, methanol may be mixed with the gasoline, preferably in an amount of less than 10 weight percent methanol. While gasoline or mixtures containing gasoline are the preferred hydrocarbonaceous fuel for use in carrying out the present invention, other sulfur-containing fuels may also be employed. For example, suitable fuels for use in fuel cells may contain other hydrocarbons in varying amounts, such as, for example,. alcohols or aromatics.

Aromatic heterocyclic compounds include alkyl substituted thiophene, thiophenol, alkylthiophene and benzothiophene. Among the aromatic heterocyclic compounds of particular interest in this application are thiophene, 2-methylthiophene, 3-methylthiophene, ethylthiophenes, dimethylthiophenes, trimethylthiophenes, benzothiophene and dimethylbenzothiophene. These aromatic heterocyclic compounds are collectively termed "thiophenes".

Mercaptans which will be removed by the process of this invention often contain from 2–10 carbon atoms, and are illustrated by materials such as 1-ethanthiol, 2-propanethiol, 2-butanethiol, 2-methyl-2-propanethiol, pentanethiol, hexanethiol, heptanethiol, octanethiol, nonanethiol and thiophenol.

Sulfur in gasoline originating from these gasoline streams may be in one of several molecular forms, including thiophenes, mercaptans and disulfides. For a given gasoline stream, the sulfur compounds tend to be concentrated in the higher boiling portions of the stream. Such a stream may be fractionated, and the heavier fraction treated using the present process. Alternatively, the entire stream may be treated. For example, light gasoline streams which are particularly rich in sulfur compounds, such as coker pentane/hexane, may be suitably treated as a blend stream which also contains a higher boiling, lower sulfur containing component. In general, gasoline streams suited for treating in the present process contain greater than about 10 ppm thiophenic compounds. Typically, streams containing more than 40 ppm thiophenic compounds, up to 2000 ppm thiophenic compounds and higher may be treated as described herein. After treatment according to the invention, the sulfur content is desirably less than about 5 ppm, preferably less than 1.0 ppm and most preferably less than 0.5 ppm.

Sulfur content in commercial gasolines are mandated for reduction. The total sulfur content of commercial gasoline to be desulfurized in the present process can exceed 50 ppm by weight, and typically can range from about 10 ppm to as much as 400 ppm sulfur. For fractions containing at least 5 vol. % boiling over about 380° F. (193° C.), the sulfur content may exceed about 100 ppm by weight and may be as high as 400 ppm by weight or even higher.

Standard analytical procedures are available for determining the total sulfur content of a gasoline stream. Gas chromatographic procedures are also readily available for analyzing specifically for thiophenic, mercaptan, and disulfide compounds in the stream.

In the present process a sulfur-containing gasoline stream is contacted with hydrogen in the presence of a hydrotreating catalyst at hydrotreating conditions and for a time sufficient to convert up to 95%, and preferably between about 70% and about 90% of the thiophenes present in the gasoline. Hydrotreating conditions suitable in the present process are particularly mild conditions, and include a reaction temperature between 300° F. and 500° F., preferably between 350° F. and 475° F., e.g. 400° F.; a total reaction pressure between 50 psig and 500 psig, preferably between 100 psig and 400 psig, e.g. between 100 psig and 200 psig, with a hydrogen partial pressure between 70 psig and 140 psig; and a space velocity between 0.5 $hr^{-1}$ and 10 $hr^{-1}$, preferably between 1 $hr^{-1}$ and 4 $hr^{-1}$, e.g. 1.2 $hr^{-1}$.

The hydrogen feed to the hydrotreating process is desirably of high purity, particularly with respect to sulfur content (including $H_2S$ content). Hydrogen containing less than 10 ppm $H_2S$ is preferred, with hydrogen containing less than 500 ppm $H_2S$ being more preferred and hydrogen containing less than 0.25 ppm $H_2S$ being still more preferred. Hydrogen purity with respect to $H_2S$ (and other sulfur species) content is most preferably as low as the economics of the process permits. Using an $H_2S$ scavenger in a hydrogen recycle loop helps maintain high hydrogen purity at low hydrogen costs. In mobile applications of the process of the invention, hydrogen may be obtained from the same source of the hydrogen used to operate the fuel cell. This is usually from the on-board fuel processor.

The catalyst for use in the hydrotreating reaction zone is a conventional hydrotreating catalyst of the type used to carry out hydrodenitrification and hydrodesulfurization reactions, and having substantially no cracking activity. Those familiar with the art recognize that such catalysts generally are constituted by a metal from Group VI and a metal from Group VIII placed on a non-acidic oxide such as alumina. The commercial catalysts generally fall into one or more of the numerous nickel-molybdenum or cobalt-molybdenum, or nickel-tungsten or cobalt-tungsten families. The catalytic metals are supported by alumina or other low acidic support material. Such catalysts to be useful in the present invention do not have cracking activity, that is they are non-zeolitic non-acidic catalysts which function to promote hydrodentrification and hydrodesulfurization reactions. Such catalysts are well known in the art. The amount(s) of hydrogenation component(s) in the catalyst suitably range from about 0.5% to about 10% by weight of Group VIII metal component(s) and from about 5% to about 25% by weight of Group VI metal component(s), calculated as metal(s) per 100 parts by weight of total catalyst. The hydrogenation components in the catalyst may be in the oxidic and/or the sulphidic form. If a combination of at least a Group VI and a Group VIII metal component is present as (mixed) oxides, it will be subjected to a sulphiding treatment prior to proper use in hydrotreating. Suitably, the catalyst comprises one or more components of nickel and/or cobalt and one or more components of molybdenum and/or tungsten and/or one or more components of platinum and/or palladium.

In the process, the hydrotreated gasoline stream recovered from the hydrotreating step is contacted with a solid adsorbent or a liquid extractant to remove some or all of the sulfur compounds remaining in the hydrotreated gasoline stream. Both the solid adsorbent and the liquid extractant are characterized by an affinity for the sulfur compounds in the gasoline stream. The process for extracting the sulfur compounds into a liquid extractant involves a liquid phase which is substantially immiscible in the gasoline stream, and which preferentially absorbs or dissolves the sulfur compounds for removal from the gasoline stream. Either an aqueous or substantially organic liquid extractant may be used. For example, n-formylmorpholine may be used to extract thiophenes from the gasoline stream.

The Merox process is particularly suited for extracting light (e.g. $C_5^-$) mercaptans. A description of the Merox process may be found, for example, in D. L. Holbrook, "UOP Merox Process", Handbook of Petroleum Refining Processes, (Second Edition) ed. Robert A. Meyers, McGraw-Hill, 1997, p. 11.29. In such mercaptan-extraction units, fresh feed is charged to an extraction column, where mercaptans are extracted by a countercurrent caustic stream. The mercaptans are converted over a metal chelate catalyst in the presence of air to a disulphide. An oily disulphide layer is recovered from the caustic. The disulfide oil can be injected into the charge to a hydrotreating unit or sold as a specialty product. A similar process is disclosed in U.S. Pat. No. 4,290,913.

The sulfur compounds remaining in the gasoline stream may also be removed by passing the gasoline stream over a solid adsorbent. Example solid adsorbents comprise materials including alumina, a zeolitic material, a clay material, included acid activated clay, activated carbon, copper on activated carbon, cobalt disulfophthalocyanine on activated carbon, metal oxides such as ZnO and magnesium aluminum oxide and UOP's Mixed Oxide Solid Solution (MOSS) material. U.S. Pat. No. 5,807,475 discloses a process for removing sulfur containing compounds from a liquid hydrocarbon stream using an adsorbent selected from the group consisting of NiX zeolite, MoX zeolite, NiY zeolite, a smectite layered clay and mixtures thereof. U.S. Pat. No. 5,843,300 discloses a similar process using an impregnated potassium-exchanged Y zeolite for adsorbing organic compounds from a petroleum feedstock. U.S. Pat. No. 5,360,536 discloses a similar process using a clay adsorbent. These disclosures are incorporated herein by reference for all purposes. Reactants for converting mercaptans, such as DuPont's Oxone process, are also suitable.

The entire disclosure of U.S. Pat. No. 5,582,714, which is incorporated herein by reference for all purposes, teaches an extraction process for removing sulfur from gasoline. Both the adsorption and the extraction process may be operated over a wide range of temperatures and pressures. However, pressures and temperatures near ambient (i.e. less than about 50° C. and less than 2 atmospheres pressure) are preferred.

Preferably, no more than 5 ppm total sulfur remains in the fuel following the sorption step using either the solid adsorbent or the liquid extractant to remove the remaining sulfur. More preferred fuel product recovered from the process contain less than about 1.0 ppm total sulfur and still more preferably less than about 0.5 ppm total sulfur. Most preferably the total sulfur content of the fuel will be less than 0.1 ppm.

In one embodiment of the fuel processor, the hydrotreating zone and the adsoption zone are incorporated into a single reaction chamber. In this configuration the hydrotreating catalyst and solid adsorbant are mixed or otherwise contained in the same reactor. From a process perspective this represents the most efficient design, since the mercaptans formed in the mild hydrotreating step are immediately scavenged by the adsorbant. However, despite its efficiency this configuration has a couple of significant disadvantages. One disadvantage is that most conventional hydrotreating catalysts must be pre-sulfided in order to be active. When the hydrotreating catalyst and the adsorbant are physically located in the proximity to one another the adsorbant may desulfide the hydrotreating catalyst shortening its effective life by deactivating it. Another disadvantage of this configuration is that it is more difficult to replace the spent adsorbant without also replacing the hydrotreating catalyst. Since the hydrotreating catalyst is relatively expensive and is expected to have a significantly longer life than the adsorbant, it is not desirable to dispose of the hydrotreating catalyst at the same time as the adsorbant is replaced. In the second configuration, the hydrotreating zone and the adsorption zone are physically separated into two separate chambers within the fuel processor. The advantage of this configuration is that it is easier to replace the adsorbant when it has been spent. Since the hydrotreating catalyst has an almost indefinite life, it is advantageous to be able to replace the spent adsorbant without also having to replace the hydrotreating catalyst at the same time. A disadvantage of this configuration over the first mentioned configuration, is that a greater quantity of adsorbent would be required to scavenge the sulfur compounds present in the feed.

However, in this latter configuration, the adsorbant may be contained in disposable canister which may be replaced periodically. In this configuration the fuel to be processed is first pasted to a hydrotreating reactor where the sulfur compounds are converted and is then passed to the second adsorption chamber where the converted sulfur compounds are scavenged. The following examples are presented as illustrating various embodiments of this invention and are not intended as an undue limitation on the generally broad scope of the invention as set out in the rest of this disclosure and the appended claims.

EXAMPLES

Example 1

A FCC gasoline containing 40 ppm total sulfur and no methanol was hydrotreated under mild conditions to produce the fuel cell fuel containing less than 1.1 ppm total sulfur. The fuel was prepared by running a FCC gasoline through a fixed bed hydrotreater containing 4.2 grams of 3% cobalt oxide/13% molybdenum catalyst (Crosfield 343). The operation conditions of the hydrotreater were set at a temperature of 425° F., a pressure of about 200 psi, a once through $H_2$ flow rate of 18 cc /min., and a space velocity of 2 $hr^{-1}$ LSHV. The mercaptans were removed from the fuel by extraction using a solution of 20% caustic in methanol, and the remaining sulfur components were then quantified on a GC to determine the total sulfur in the fuel. Prior to extraction the fuel was found to contain 4.9 ppm of total sulfur.

Example 2

A FCC gasoline containing 40 ppm total sulfur and no methanol was hydrotreated under mild conditions to produce the fuel cell fuel containing less than 0.5 ppm total sulfur. The fuel was prepared by running the FCC gasoline through a fixed bed hydrotreater containing 4.2 grams of 3% cobalt oxide/13% molybdenum catalyst (Crosfield 343). The operation conditions of the hydrotreater were set at a temperature of 425° F., a pressure of about 200 psi, a once through $H_2$ flow rate of 44 cc/min., and a space velocity of 2 $hr^{-1}$ LSHV. The mercaptans were removed from the fuel by extraction, and the remaining sulfur components were then quantified on a GC to determine the total sulfur in the fuel. Prior to extraction the fuel was found to contain 3.1 ppm of total sulfur.

What is claimed is:

1. A process for desulfurizing a hydrocarbonaceous fuel intended for use in a PEM fuel cell which comprises:
   a) contacting a hydrocarbonaceous fuel containing sulfur with hydrogen in the presence of a hydrotreating catalyst at a temperature of between 300° F. and 500° F., a total pressure between 50 psig and 500 psig, and a space velocity between 0.5 $hr^{-1}$ and 10 $^{-1}$ for a time sufficient to convent up to 95% of the thiophenes present in the fuel, to produce a hydrotreated hydrocarbonaceous fuel;
   b) contacting the hydrotreated hydrocarbonaceous fuel with a solid adsorbent or a liquid extractant selected to reduce the sulfur compounds remaining in the hydrotreated hydrocarbonaceous to 5.0 ppm or less;
   c) recovering a hydrocarbonaceous fuel having a sufficiently reduced sulfur content wherein it is suitable for use as a fuel in a PEM fuel cell; and
   d) supplying the hydrocarbonaceous fuel recovered in step (c) as fuel for a PEM fuel cell.

2. The process of claim 1 wherein the hydrocarbonaceous fuel is gasoline.

3. The process of claim 1 wherein the hydrocarbonaceous fuel contains methanol.

4. The process of claim 3 wherein the hydrocarbonaceous fuel is a mixture containing 10% or less by weight of methanol.

5. The process according to claim 2 to convert from 70% to 90% of the thiophenes present in the gasoline.

6. The process according to claim 2 wherein hydrotreating conditions include a reaction temperature between 350° F. and 475° F. and a total pressure between 100 psig and 400 psig.

7. The process according to claim 6 wherein the hydrotreating conditions include a space velocity between about 1.0 $hr^{-1}$ and 4.0 $hr^{-1}$ LHSV.

8. The process according to claim 2 to produce a gasoline which contains less than about 1 ppm sulfur.

9. The process according to claim 8 to produce a gasoline which contains less than about 0.5 ppm sulfur.

10. The process according to claim 9 to produce a gasoline which contains less than about 0.1 ppm sulfur.

11. The process according to claim 1 wherein the hydrotreating catalyst contains at least one of nickel and cobalt.

12. The process according to claim 1 wherein the hydrotreating catalyst contains at least one of molybdenum and tungsten.

13. The process according to claim 1 wherein the hydrotreating catalyst contains at least one of platinum and palladium.

14. The process according to claim 1 wherein the hydrotreating catalyst comprises nickel and molybdenum on an alumina support.

15. The process according to claim 1 wherein the solid adsorbent comprises at least one material selected from the group consisting of alumina, a zeolitic material, a clay material, activated carbon, copper, and metal oxides.

16. The process of claim 1 wherein the reduced sulfur fuel is intended for use in a stationary fuel cell.

17. The process of claim 1 wherein the reduced sulfur fuel is intended for use in a fuel cell in a vehicle.

* * * * *